United States Patent [19]
Yama et al.

[11] Patent Number: 5,696,871
[45] Date of Patent: Dec. 9, 1997

[54] DC MOTOR CONTROL CIRCUIT

[75] Inventors: Michiaki Yama; Sachito Horiuchi, both of Kyoto, Japan

[73] Assignee: Rohm Co., Ltd., Kyoto, Japan

[21] Appl. No.: 611,052

[22] Filed: Mar. 5, 1996

[30] Foreign Application Priority Data

Mar. 6, 1995 [JP] Japan ................... 7-072313

[51] Int. Cl.$^6$ ........................................... H02P 5/165
[52] U.S. Cl. ................... 388/814; 388/815; 318/256; 318/138; 318/439
[58] Field of Search ........................ 388/814, 815; 318/254, 138, 439

[56] References Cited

U.S. PATENT DOCUMENTS

| | | | |
|---|---|---|---|
| 3,576,484 | 4/1971 | Gambill | 388/814 |
| 3,710,219 | 1/1973 | Takahashi et al. | 318/254 X |
| 4,008,422 | 2/1977 | Sodekoda et al. | 318/138 X |
| 4,506,199 | 3/1985 | Asche | 318/254 X |

FOREIGN PATENT DOCUMENTS 6-245573  9/1994  Japan .

*Primary Examiner*—Karen Masih
*Attorney, Agent, or Firm*—Fay, Sharpe, Beall, Fagan, Minnich & McKee

[57] ABSTRACT

A DC motor control circuit which contains a DC motor as a part of bridge resistance constituting a bridge circuit includes a first terminal connected to one end of the DC motor in the bridge circuit. A switching transistor is connected to the first terminal. A second terminal is connected to the other end of the DC motor. A switching control circuit detects an unbalanced condition of the bridge circuit via the second terminal and controls the switching period of the switching transistor so as to restore the bridge circuit to a predetermined unbalanced condition or balanced condition. A part of the bridge circuit, the switching transistor and the switching control circuit are integrated into an IC, thereby the number of terminals for the IC is reduced and a coil and an externally added capacitor both for smoothing are unnecessary.

11 Claims, 5 Drawing Sheets

1

DC MOTOR CONTROL CIRCUIT

BACKGROUND OF THE INVENTION

1. Field of the Invention

The present invention relates to a DC (Direct Current) motor control circuit and, more specifically, relates to a DC motor control circuit in an audio device such as a portable cassette stereo device which permits reduction in the number of externally connected components of an IC control circuit of a motor for driving a recording medium and to reduce the entire size of the device.

2. Background Art

An example of conventional DC motor control circuits for the devices of such kind is shown in FIGS. 4(a) and 4(b). FIG. 4(a) is a fundamental block diagram and FIG. 4(b) is a specific circuit diagram thereof.

In the device of such kind, an electronic governor type control circuit constituted by a bridge circuit is normally used. Thereby, the major portion of the control circuit is formed into an IC as a DC motor control IC 10. In such DC motor control circuit formed into an IC, as shown in FIG. 4(a), a resistance bridge circuit is formed by resistors R1, R2 and R3 and a motor 1 (of its equivalent internal resistance Rm). Further, a voltage obtained by adding a voltage Ec for setting a motor rotation speed to a voltage at the junction point A of the resistors R1 and R2 and a voltage at the junction point B of the resistor R3 and the equivalent internal resistor Rm are compared and amplified in an error amplifier circuit 15 in such a manner that the error amplifier circuit 15 controls a voltage Eb representing an input voltage of the bridge circuit so as to coincide these two voltages.

More specifically, as shown in FIG. 4(b), the voltage drop due to a transistor Q1 from a constant value power source voltage Ea of a battery E is generated through a control of the transistor Q1 by an error amplifier circuit 140. In more detail, an amount of the voltage drop due to the transistor Q1 is determined in correspondence with an error voltage ΔE outputted from the error amplifier circuit 140 and the value of the voltage Eb is controlled so that the difference of the two input voltages for the error amplifier circuit 140 is rendered to "0". As a result, this bridge circuit reaches a predetermined unbalanced condition by the voltage Ec of the variable resistor VR.

Accordingly, the counter electromotive voltage Em of the DC motor (hereinbelow simply called as motor) 1 is maintained to assume Ec (R1+R2)/R1. Since the counter electromotive voltage Em of the motor 1 determines the rotation speed thereof, the rotation speed of the motor 1 can be adjusted by the voltage Ec for setting the rotation speed.

In the drawing, Vref is a constant voltage source for generating a reference voltage and VR is an externally connected variable resistor. Although not shown in the drawing, for example, in a device using a magnetic tape as its recording medium a tape driving roller is driven by the motor 1 and the magnetic tape runs via the roller. For the magnetic tape audio signals are recorded via a magnetic head or read out and reproduced therefrom.

In the conventional DC motor control circuit as explained above, through the control of the amount of the voltage drop from the power source voltage Ea, the input voltage Eb for the bridge circuit is produced and the rotation speed of the motor 1 is controlled via the input voltage Eb. The electric power corresponding to the dropped voltage Ea-Eb at this moment is converted into heat in the voltage drop controlling transistor Q1 and is dissipated therefrom without being converted into rotation force for the motor 1 which increases the electric power loss therein and reduces the efficiency thereof.

In particular, for battery operated portable audio devices, if such electric power loss is great, the device can operated merely a short time which is a significant problem for such kind of devices. Further, in order for dissipating such generated heat the voltage drop controlling transistor Q1 requires a so called heat dissipation type package having an excellent heat dissipation property which increases the size of the transistor in comparison with a conventional one which is contrary to the size reduction requirement for the portable type devices.

In the conventional DC motor control circuit, since the voltage Ec for setting the rotation speed is set with reference to the voltage at the junction point A of the resistors R1 and R2 which constitute a part of the bridge circuit, the generating circuit of the voltage Ec uses a variable reistor VR in order to make the rotation speed of the motor 1 variable or in order to absorb variations such as in the motor characteristic and to adjust the rotation speed at a predetermined constant value. Therefore, all of the components therefor can not be incorporated into a single IC and at least a circuit component used for adjusting the motor rotation speed such as the variable resistor VR is added externally to the IC 10. For this reason, when the DC motor control circuit is integrated into the IC 10, in addition to a grounding use terminal 11 and a motor connection use terminal 14, terminals 12 and 13 are necessitated which are used for connecting such as the variable resistance element to the generating circuit of the voltage Ec for setting the motor rotation speed. Further, an electric power input terminal 15 and a control terminal 16 are also necessitated which are to be connected to the electric power controlling transistor Q1.

When the number of terminals for the IC increases as explained, packages for the IC increases accordingly which is undesirable for the size reduction of the devices.

In order to avoid such problem the applicant has proposed a DC motor control circuit which supplies an electric power via a switching regulator method in JP-A-6-245573(1994).

FIG. 5 is a block diagram showing the outline thereabove. The DC motor control circuit is constituted by a switching circuit 160 including a PNP type switching transistor Q2, a smoothing circuit 180 including an induction coil L2, a diode D and capacitor C, a switching control circuit 150, a bridge circuit 130 composed by resistors R1, R2 and R3 and a motor 1 to be connected externally, an error amplifier 140 and a voltage generating circuit 170 which is used for setting the rotation speed. Herein, the switching control circuit 160, the bridge circuit 130 and the voltage generating circuit 170 are integrated inside an IC 100 and numerals 11, 13, 14, 15 and 16 are terminals for the IC 100. In FIG. 5 circuit, the terminal 12 in FIG. 4(b) circuit is eliminated, thereby the number of terminals to be used is reduced by one.

The present motor control circuit generates a voltage Ec' by dividing the voltage of a constant voltage power source Vref with the externally added variable resistor VR, inputs the voltage Ec' to a differential amplifier 170a in the voltage generating circuit 170 and thereby, determines one terminal voltage Ec (E12) of the resistor R2, one of the resistors composing the bridge (hereinbelow one of the resistors composing the bridge is simply called as bridge resistor). In response thereto, the terminal voltage of the motor 1 is determined, as a result, the rotation speed of the motor 1 is set.

Under this set motor rotation speed, when a variation in the terminal voltage of the motor 1 is caused, a difference between the voltage E12 and a voltage E3m representing a balanced condition of the bridge circuit is generated and detected. The detected value is amplified by an amplifier 140a in the error amplifier 140 as the error component. Then, a detection signal (error signal ΔE) in a form of a DC voltage having a predetermined level is transmitted to a comparator (Cmp) 151 in the switching control circuit 150. The comparator 151 compares the level (ΔE) of the detection signal with, for example, an output from a saw tooth wave oscillator (OSC) 152 and, applies a driving pulse of a predetermined pulse width depending on the level of the detection signal to the base of the transistor Q2 in the switching circuit 160 to turn ON/OFF the same. Thereby, the transistor Q2 is switching-controlled via a PWM control. As a result, this bridge circuit becomes a balance condition.

Further, a capacitor C1 connected to the saw tooth wave oscillator (OSC) 152 determines the oscillation frequency and the wave form thereof, and is externally connected to the IC 100 via the terminal 17.

In such motor control circuit, the on period of the transistor Q2 is set in response to the error signal in a direction to eliminate the difference. An electrical power depending on the switching on period is supplied from the switching circuit 160 to the bridge circuit 130 via the smoothing circuit 180 to control the motor 1 at a constant rotation speed. Thereby, the electrical power comsumption can be reduced in comparison with the conventional devices.

However, the requirement for reducing the size is particularly keen for portable type audio devices so that the present motor control circuit still contains a problem that there are many components which can not be incorporated into the IC and have to be connected externally. Further, in the present motor control circuit it is desired to pass the error signal ΔE through a low pass filter using an externally connected capacitor in order to remove switching noises of the switching regulator, therefore in such instance, one more externally connected capacitor has to be further added.

SUMMARY OF THE INVENTION

An object of the present invention is to provide a DC motor control circuit which permits to reduce an electrical power consumption therein and to reduce the number of externally connected components to a motor control IC therefor and is suitable for reducing the size for an entire device therefor.

A DC motor control circuit according to the present invention, which achieves the above object and which includes a DC motor as a part of resistors constituting a bridge circuit and controls a balance of the bridge circuit so as to set the rotation speed of the DC motor at a predetermined value, includes the following.

A first terminal is connected to one end of the DC motor in the bridge circuit.

A switching transistor connected to the first terminal.

A second terminal connected to the other end of the DC motor, and

A switching control circuit detects an unbalanced condition of the bridge circuit via the second terminal and controls the switching period of the switching transistor in a frequency region exceeding audio frequencies so as to restore the bridge circuit to a predetermined unbalanced condition or the balanced condition. A part of the bridge circuit, the switching transistor and the switching control circuit are integrated into an IC and the first and second terminals constitute external connection pins for the IC.

In the thus constituted motor control circuit, since the electrical power to the DC motor is switched by the switching transistor, the loss generated during electric power control to the DC motor is not always generated but only generated transiently during switching period thereof and the ON resistance during the switching period is low. Moreover, in association with the special configuration in which the switching transistor and the DC motor are connected in series, the coil in the DC motor serves as the coil for smoothing, thereby, a conventional coil and an externally connected capacitor for smoothing are unnecessary.

As a result, the electrical power loss is reduced, the effeciency of the circuit is improved and the number of externally connected components for the motor control IC is reduced. Thereby, the entire size reduction of the device can be achieved. Further, when the supply electric power to the circuit is small, a flywheel diode inserted in parallel with the DC motor can be incorporated into the IC.

BRIEF DESCRIPTION OF THE DRAWINGS

FIGS. 4(a) and 4(b) are views for explaining an example of conventional DC motor control circuits, wherein FIG. 4(a) is a block diagram for explaining the principle thereof and FIG. 4(b) is a specific circuit diagram thereof.

DETAILED DESCRIPTION OF THE PREFERRED EMBODIMENTS

Figure 1:
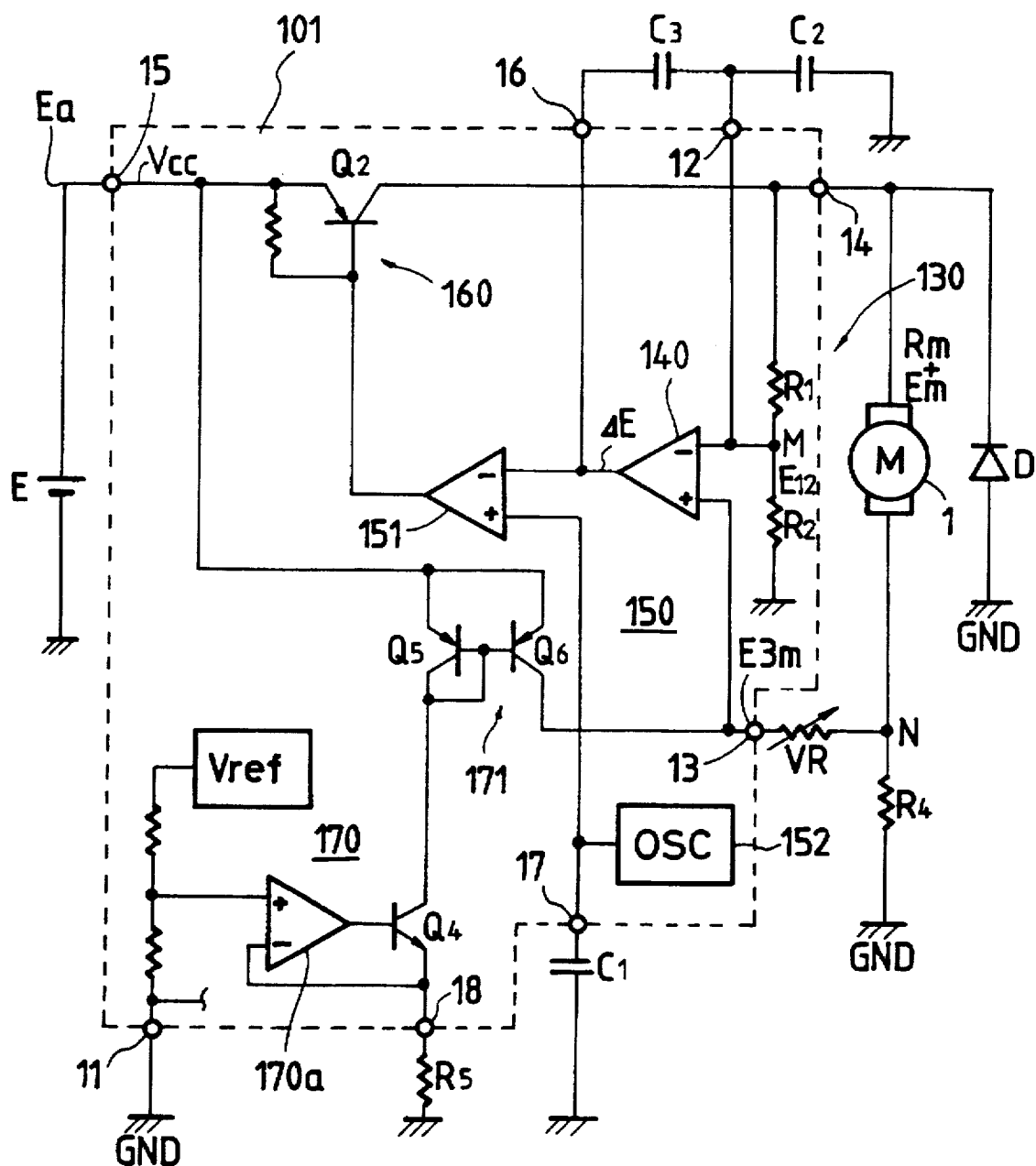
FIG. 1 is a block diagram of one embodiment using a bipolar transistor as a switching transistor to which a DC motor control circuit according to the present invention is applied.
Figure 4A:
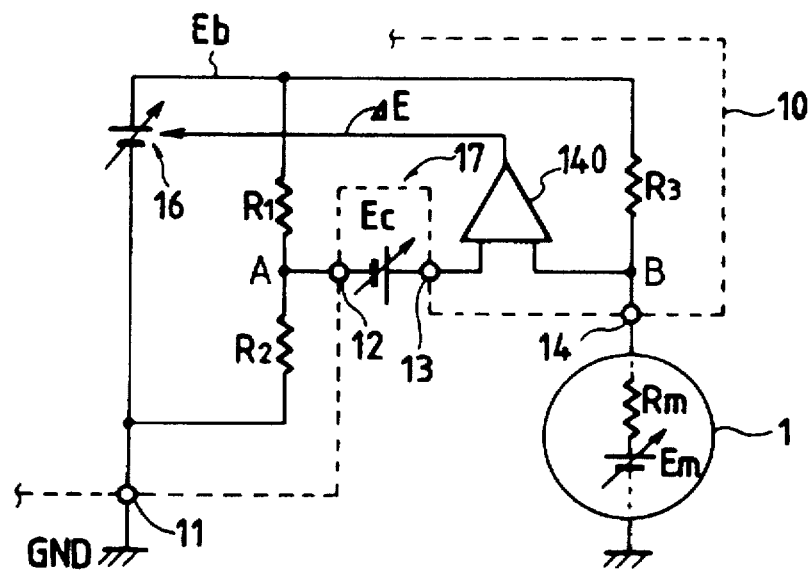
Figure 4B:
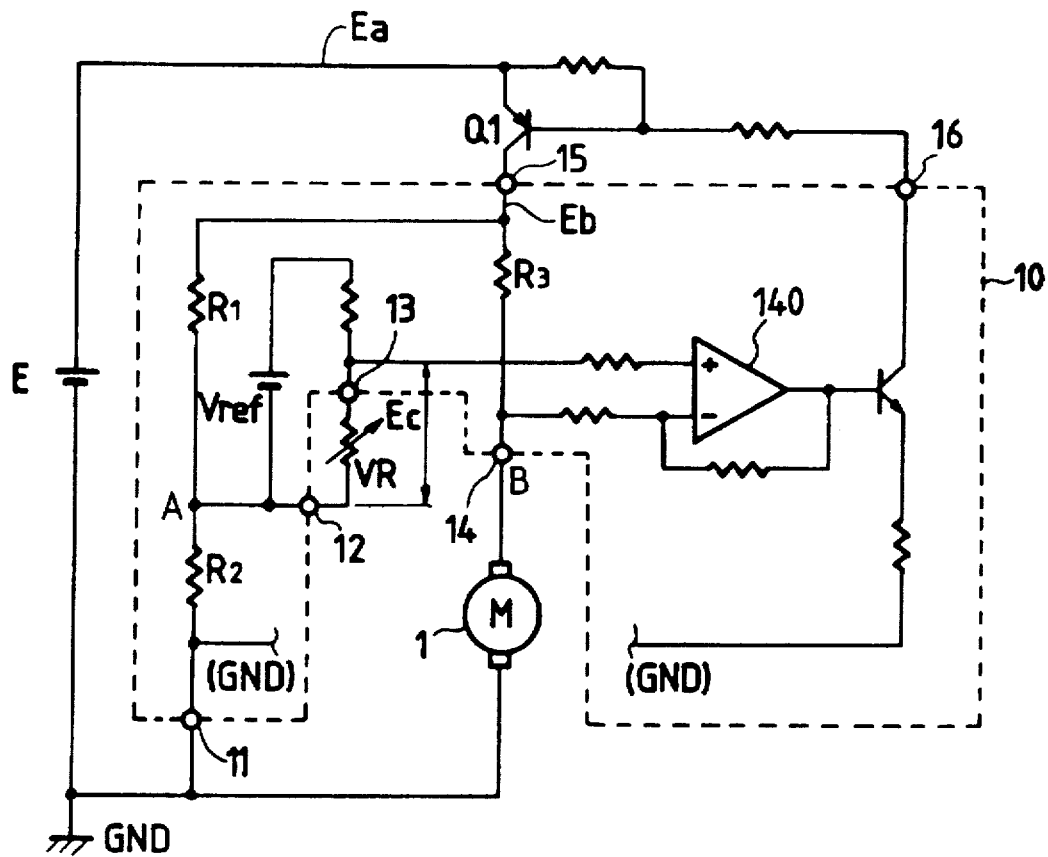

FIG. 1 shows a motor control circuit in which a DC motor and a switching transistor are provided at the electrical power supply side of a resistance bridge circuit, these circuits are incorporated into an IC 101 and the coil of the DC motor is used in a smoothing circuit. The elements in FIG. 1 performing substantially the same functions as those in FIGS. 4(a, 4(b) and 5 are designated by the same numerals as those in FIGS. 4(a), 4(b) and 5.

Figure 5:
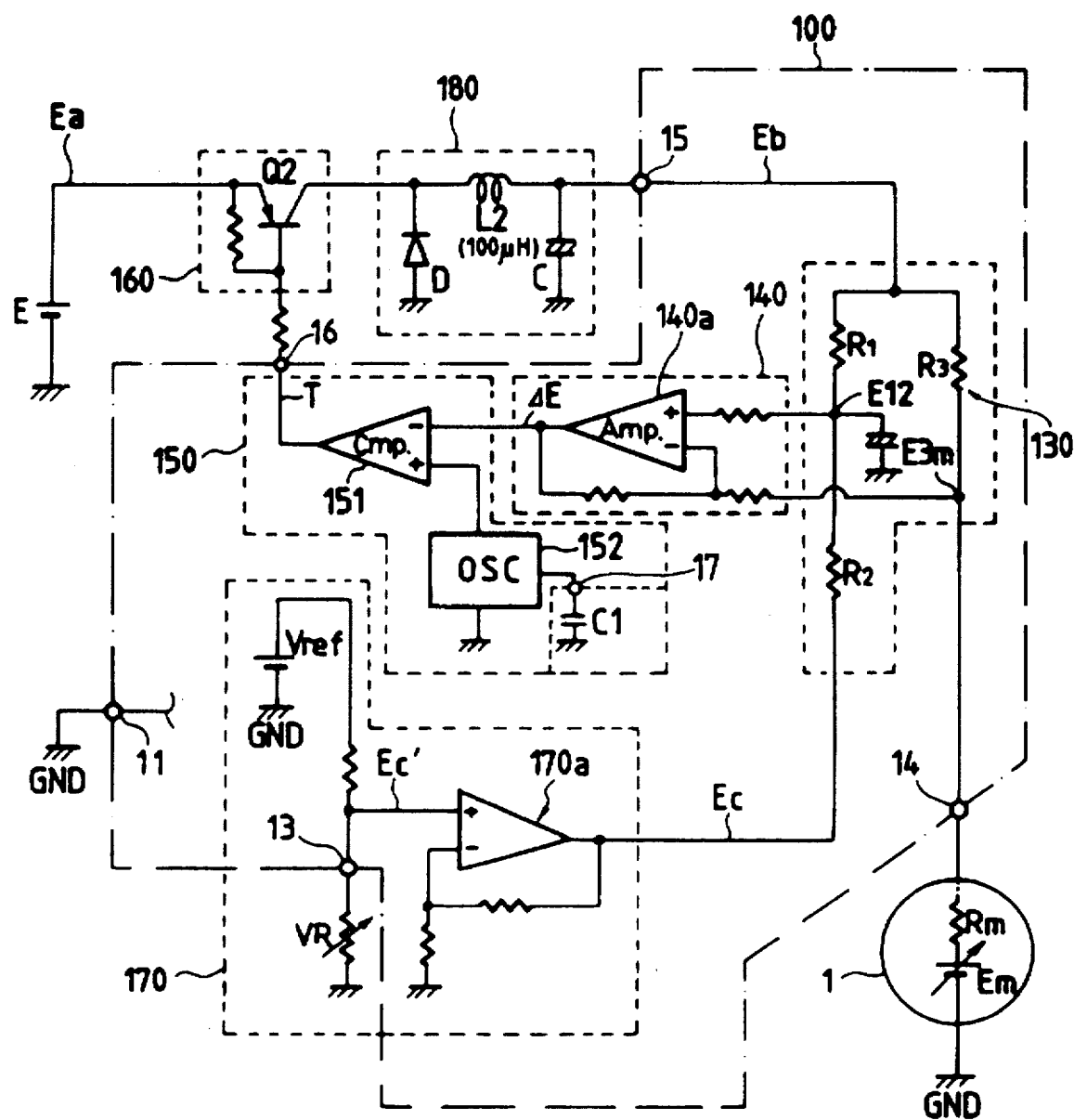
FIG. 5 is a block diagram of a conventional DC motor control circuit in which an improvement is applied to FIGS. 4(a) and 4(b) DC motor control circuit.

A motor 1 is connected between a terminal 14 for the motor connection and a bridge resistor R4 and is disposed at the electrical power supply side of the resistance bridge circuit. Namely, the motor 1 is provided in place of the bridge reistance R3 in the bridge circuit 130 as shown in FIG. 5. Accordingly, the bridge resistor R3 in FIG. 5 is eliminated, and in place of the resistor R3 a bridge resistor R4 is connected at the position of the motor 1 in FIG. 5 and the motor 1 is grounded via the resistor R4.

Between the junction point N of the motor 1 and the resistor R4 and a terminal 13 of the IC 101 a variable resistor VR for adjusting the rotation speed of the motor 1 is provided as an externally added component. With the variable resistor VR, the voltage applied to the motor 1 is adjusted and the rotation speed of the motor 1 is set. As a result, the bridge circuit 130 becomes a predetermined unbalanced condition by the voltage of the variable resistor VR.

A switching transistor Q2, of which emitter is connected to a power source input terminal 15 via a power source line Vcc and of which collector is connected to the terminal 14, is integrated into the IC 101. The portion surrounded by the dotted lines shows the IC 101. A flywheel diode D in a smoothing circuit 180 is connected between the terminal 14 and the ground and forms a circulating passage for circulating a current flowing through the motor 1 when the switching transistor Q2 is turned OFF. In the present circuit the capacitor C and the inductance coil L2 in FIG. 5 are eliminated. Thereby, the switching transistor Q2 and the smoothing circuit 180 are saved not to be included in the externally added components and correspondingly the number of externally added components for the IC 101 is reduced.

Further, the electric power Ea of the battery E is conveyed to the switching transistor Q2 via the electrical power input terminal 15.

To the electrical power input terminal 15, a current mirror circuit 171 constituted by transistors Q5 and Q6 is connected which operates as an active load for the voltage generating circuit 170. The output of the transistor Q6 at the output side of the current mirror circuit 170 is applied to (+) input of the error amplifier 140 as well as transmitted to the terminal 13. The transistor Q5 at the input side the current mirror circuit 170 is grounded via the transistor Q4, a terminal 18 and a resistor R5.

The transistor Q4, of which base is driven by the output of the differential amplifier 170a, amplifies the output and generates a reference voltage of a constant level at the terminal 13 and (+) input of the error amplifier 140 via the current mirror circuit 170.

Further, different from the specific example in FIG. 5, in the present embodiment capacitors C2 and C3 for removing noises are added. Namely, the junction point M of the bridge resistors R1 and R2 is grounded via the terminal 12 and the externally connected capacitor C2. Thereby, a low pass filter is constituted by the resistors R1 and R2 and the capacitor C2. As a result, only variable signals of low frequencies of which switching noises are removed can be generated as the detection signals. Further, through the connection of the output terminal of the error amplifier 140 to the terminal 16 and the connection of the capacitor C3 between the terminals 16 and 12 the error signal ΔE is inputted to the comparator 151 after being smoothed.

In the present control circuit the motor 1 is connected in series with the collector of the PNP type switching transistor Q2 and an electrical power is supplied to the motor 1 through the series connection. Thereby, the coil included in the motor 1 performs the same function as the eliminated coil L2 in FIG. 5 and serves as a substitution therefor.

As a result, if the capacitor C and the induction coil L2 for the smoothing use are eliminated, a speed control of the motor 1 can be performed like in the conventional circuit with reduced number of externally added components.

Figure 2:
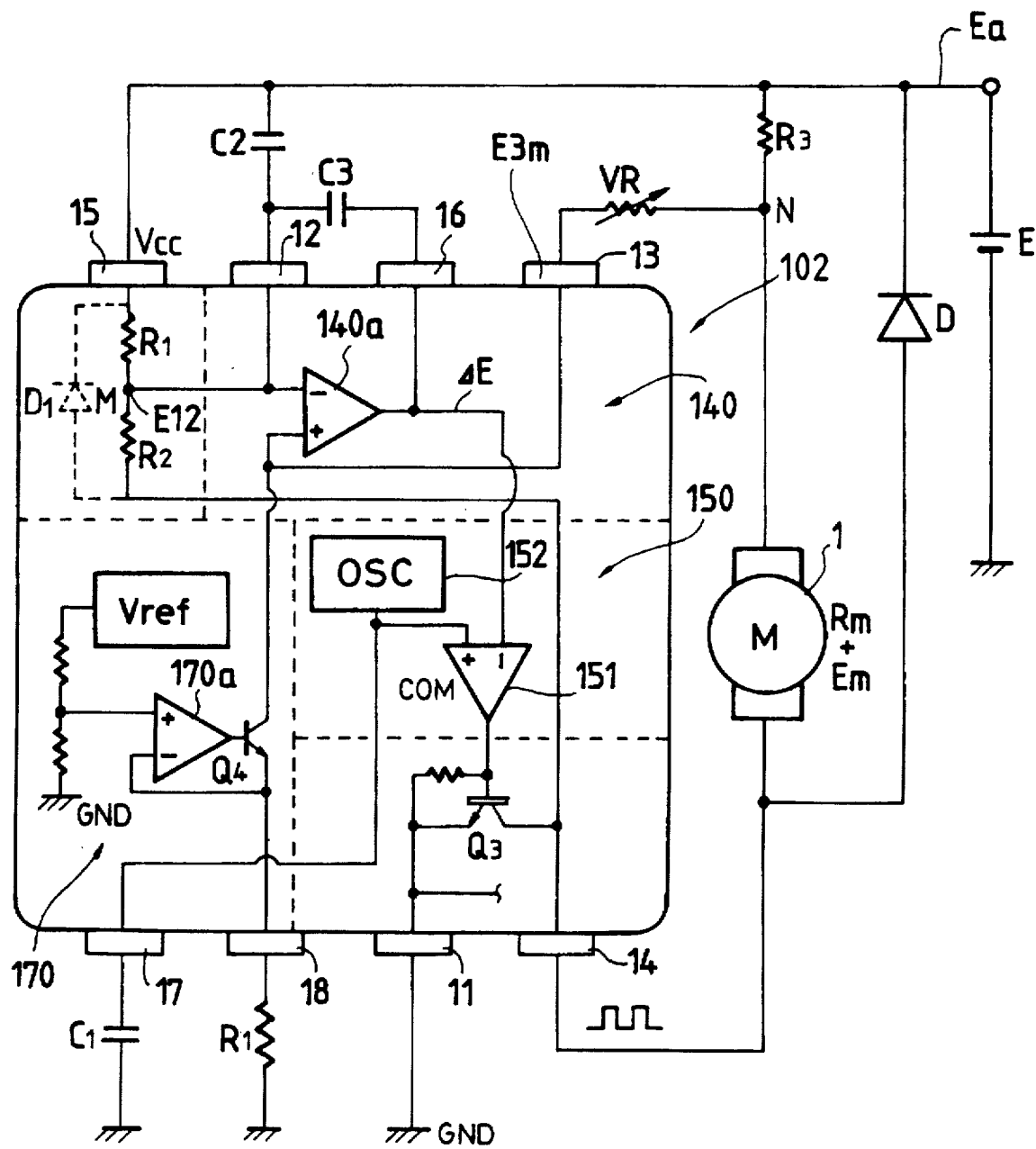
FIG. 2 is a block diagram of another embodiment using a bipolar transistor as a switching transistor to which a DC motor control circuit according to the present invention is applied.

FIG. 2 is another embodiment in which an NPN type switching transistor Q3 is used in place of the PNP type switching transistor Q2 in FIG. 1. The switching transistor Q3 is provided at the ground side and is integrated into an IC 102.

A motor 1 is provided in place of the bridge resistor R4 and is connected between a bridge resistor R3 and a terminal 14, the other terminal of the resistor R3 is connected to an electrical power input terminal 15. Like in FIG. 1, between the junction point N of the motor 1 and the resistor R3 and a terminal 13, a variable resistor VR for adjusting the rotation speed of the motor 1 is provided.

The collector of the transistor Q3 is connected to the terminal 14 inside the IC 102. The emitter thereof is grounded outside the IC 102 via a terminal 11. Thereby, the motor 1 is connected to the ground GND via the terminal 14 and the emitter-collector of the transistor Q3.

Further, a series circuit of bridge resistors R1 and R2 is connected between the terminals 14 and 15, and like the motor 1 one terminal of the bridge resistor R2 is connected to the ground GND via the emitter-collector of the transistor Q3. A flywheel diode D in a smoothing circuit 180 is connected between the terminals 15 and 14 in the opposite direction as in FIG. 1.

Since the operation of the present embodiment is identical as that of FIG. 1 embodiment, the explanation thereof is omitted.

A diode D1 as shown by dotted lines and connected in parallel with a series circuit of the resistors R1 and R2 can be provided if required.

Figure 3:
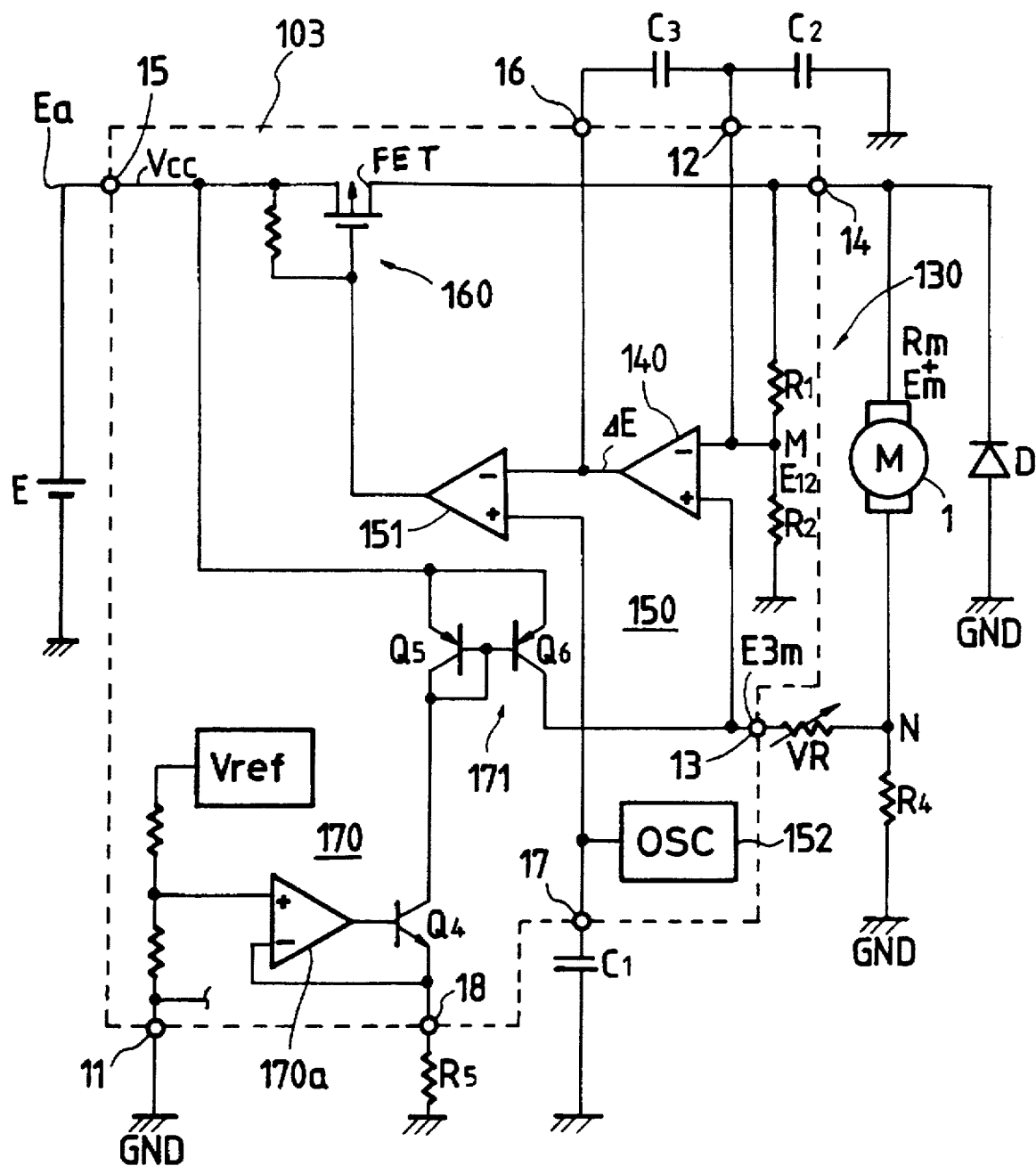
FIG. 3 is a block diagram of still another embodiment using a FET transistor as a switching transistor to which a DC motor control circuit according to the present invention is applied.

FIG. 3 shows an IC 103 in which the PNP type transistor Q2 is replaced by a PNP type FETMOS transistor FET. In the present embodiment, the drain and source of the transistor FET are assigned in place of the collector and emitter of the transistor Q2 in FIG. 1.

Since the operation of the present embodiment is identical as that of FIG. 1 embodiment, the explanation thereof is also omitted.

Further, the transistor Q3 in FIG. 2 can be replaced by an NPN type FETMOS transistor.

Still further, the PNP type transistor in FIGS. 1 and 2 can be replaced by an NPN type transistor. However, in such modification the relationship between the emitter and collector is reversed and the ON and OFF switching period are exchanged.

We claim:

1. A DC motor control circuit which includes a DC motor as a part of resistors constituting a bridge circuit and controls a balance of the bridge circuit so as to set a rotation speed of the DC motor at a predetermined value comprising:

a first terminal connected to one end of said DC motor in said bridge circuit;

a switching transistor connected to said first terminal;

a second terminal connected to the another of said DC motor; and a switching control circuit which detects an unbalanced condition of said bridge circuit via said second terminal and controls a switching period of said switching transistor in a frequency region exceeding audio frequencies so as to restore said bridge circuit to one of a predetermined unbalanced condition and a balanced condition, wherein a part of said bridge circuit, said switching transistor and said switching control circuit are integrated into an IC and said first and second terminals constitute external connection pins for said IC.

2. A DC motor control circuit according to claim 1, wherein said bridge circuit is a resistance bridge circuit including said DC motor, said switching transistor is connected between a power source line and said first terminal and said DC motor is grounded via one of the resistors constituting said resistance bridge circuit.

3. A DC motor control circuit according to claim 1, wherein said bridge circuit is a resistance bridge circuit including said DC motor, said switching transistor is connected between said first terminal and ground and said another end of said DC motor is connected to a power source line via one of resistors constituting said resistance bridge circuit.

4. A DC motor control circuit according to claim 2, wherein said switching transistor is a bipolar transistor and one of an emitter and collector of said bipolar transistor is connected to said first terminal and the other thereof is connected to the power source line.

5. A DC motor control circuit according to claim 2, wherein said switching transistor is a MOSFET transistor and one of a drain and source of said MOSFET transistor is connected to said first terminal and the other thereof is connected to the power source line.

6. A DC motor control circuit according to claim 4 further comprising, a variable resistor for adjusting the rotation speed of said DC motor provided between a junction point of said resistor and said DC motor and said second terminal.

7. A DC motor control circuit according to claim 6 further comprising, a third terminal connected to the power source line, a constant voltage circuit which generates a predetermined constant voltage at said second terminal and a battery connected between said third terminal and ground, wherein said constant voltage circuit is integrated into said IC together with a part of said resistance bridge circuit, said switching transistor and said switching control circuit.

8. A DC motor control circuit according to claim 7, wherein said resistance bridge circuit is constituted by said DC motor, said resistor and other two resistors, said other two resistors are connected in series between said second terminal and the ground and integrated into said IC, said switching control circuit includes an error amplifier which receives a voltage at the junction point of the other two resistors and a voltage at said second terminal and generates a difference of these two voltages as an error signal to thereby control an ON period of said switching transistor in response to the error signal.

9. A DC motor control circuit according to claim 8, wherein the error signal is a voltage signal, and said switching control circuit includes a saw tooth wave generating circuit which oscillates at a frequency exceeding the audio frequencies and a comparator which compares an output from said saw tooth wave generating circuit with the error signal and outputs a pulse having a pulse width depending on a voltage value of the error signal to a base of said switching transistor.

10. A DC motor control circuit according to claim 3, wherein said switching transistor is a bipolar transistor and one of a collector and emitter of said bipolar transistor is connected to said first terminal and the other thereof is connected to ground, and a variable resistor for adjusting the rotation speed of said DC motor is provided between a junction point of said resistor and said DC motor and said second terminal.

11. A DC motor control circuit according to claim 10 further comprising, a third terminal connected to a power source line, a constant voltage circuit which generates a predetermined constant voltage at said second terminal and a battery connected between said third terminal and the ground, wherein said constant voltage circuit is integrated into said IC together with a part of said resistance bridge circuit, said switching transistor and said switching control circuit.

* * * * *